3,679,666
4-[4-HYDROXYPIPERIDINO]-4'-FLUOROBUTYROPHENONES

Nicholas Malatestinic, Staten Island, N.Y., and Albert Ziering, Nutley, N.J., assignors to Hoffmann-La Roche Inc., Nutley, N.J.
No Drawing. Original application July 1, 1966, Ser. No. 563,962. Divided and this application Apr. 3, 1969, Ser. No. 813,317
Int. Cl. C07d 29/20
U.S. Cl. 260—293.8     2 Claims

ABSTRACT OF THE DISCLOSURE

Compounds of the formula

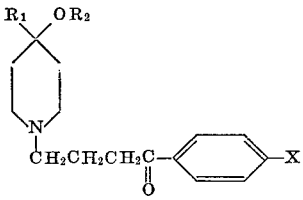

are described. These compounds are useful as analgesics, anti-pyretic and anti-inflammatory agents.

RELATED APPLICATIONS

This application is a division of co-pending application Ser. No. 563,962, filed July 11, 1966, now abandoned.

BRIEF DESCRIPTION OF THE INVENTION

This invention relates to a novel class of butyrophenone derivatives and novel intermediates useful in the preparation thereof. More particularly, the invention relates to novel compounds of the formula

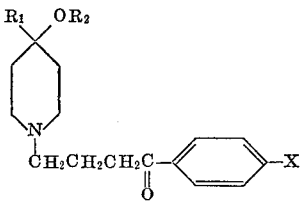

wherein X is halogen, e.g., fluorine, bromine, chlorine or iodine; $R_1$ is lower alkyl, cyclo-lower alkyl, cyclo-lower alkyl-lower alkyl, hydroxy lower alkyl or lower alkoxy-lower alkyl and $R_2$ is hydrogen or acyl and salts thereof.

The term "lower alkyl" as used herein denotes straight or branched chain hydrocarbons containing 1 to 7 carbon atoms, e.g., methyl, ethyl, propyl, isopropyl, butyl, tertiary butyl, and the like. The term "cyclo-lower alkyl" denotes monocyclic saturated carbocyclic groups of 3 to 6 carbon atoms, e.g., cyclopropyl, cyclopentyl, cyclohexyl, etc. The term "lower alkoxy" denotes lower alkyl ether groups in which the lower alkyl moiety is as defined above. The term "halogen" denotes all of the halogens, i.e., bromine, chlorine, fluorine and iodine. The term "acyl" denotes the acid moiety of a carboxylic acid particularly a lower alkanoic acid or benzoic acid, e.g., lower alkanoyl such as acetyl, propionyl and butyryl or benzoyl and the like.

The novel 4-(4-hydroxypiperidino)-4'-halobutyrophenones of this invention, i.e., the compounds of Formula I above, wherein $R_2$ is hydrogen, may be obtained by reacting a 4-piperidinol of the formula

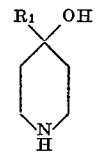
II wherein $R_1$ has the same meaning as above with a butyrophenone derivative of the formula

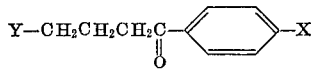
III wherein Y is a leaving group such as a halogen, e.g., chlorine, bromine, iodine, and the like, and X has the same meaning as above.

The end products of Formula I above wherein $R_2$ is acyl are prepared from the corresponding hydroxy compounds, i.e., compounds of Formula I wherein $R_2$ is hydrogen, by reacting with any of the usual acylating agents, preferably a lower alkanoic anhydride such as acetic anhydride, propionic anhydride, etc.; or an acyl halide such as propionyl chloride and the like.

The condensation of a compound of Formula II with a compound of Formula III is suitably carried out in the presence of an inert organic solvent such as, for example, aromatic hydrocarbon solvents, e.g., toluene, benzene, xylene, etc.; alcohols such as methanol, ethanol, propanol, etc.; acetone, pentanone, dimethylformamide and the like, and conveniently at a temperature between about room temperature and the reflux temperature of the reaction mixture, e.g., at a temperature between about 20° C. and about 150° C. If desired the condensation reaction may be carried out with an acid acceptor present. Suitable acid acceptors are for example alkali metal carbonates, e.g., potassium carbonate, sodium carbonate, etc., tertiary amines such as triethylamine and the like.

The starting 4-alkyl-4-piperidinols of Formula II are prepared by treating an N-substituted piperidone with the appropriate alkali-alkyl and subsequently hydrogenating as necessary to remove the nitrogen protecting group. The preparation of the 4-piperidinol starting materials can be traced with reference to the following reaction scheme:

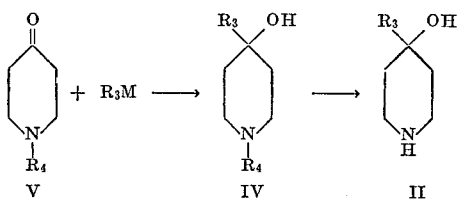

In the above formulae $R_3$ is lower alkyl, cyclo-lower alkyl, cyclo-lower alkyl-lower alkyl or lower alkoxy-lower alkyl; $R_4$ is any suitable prtoecting group such as benzyl, acetyl and the like; and M represents an alkali metal such as lithium or magnesium.

Certain of the intermediates of Formulas II and IV are also novel and thus constitute a part of this invention.

The butyrophenone starting materials of Formula III are prepared by known processes, for example by reacting a γ-chlorobutyryl chloride with a halobenzene, e.g., fluorobenzene, bromobenzene or iodobenzene in the presence of a Friedel-Crafts catalyst, e.g., stannic chloride, aluminum chloride and the like.

The novel end products of this invention, i.e., compounds of Formula I, can be obtained in the form of free bases or as salts thereof. Salts may be converted into the free base, for example, by reaction with an alkaline reagent such as, for example, an aqueous alkali metal carbonate such as sodium or potassium carbonate and the like. A free base may be converted into its acid addition salts by reacting the former with a suitable inorganic or organic acid. Preferred salts of the compounds of this invention are obtained from therapeutically acceptable acids, for example, inorganic acids such as mineral acids, e.g., hydrochloric, hydrobromic, sulfuric, phosphoric, and the like, or organic acids such as acetic, propionic, lactic, succinic, maleic, tartaric, citric, cinnamic, salicyclic, and the like. Quaternary ammonium salts of the compounds of this invention may be obtained, for example, by reacting a compound of Formula I with a lower alkyl halide, e.g., methyl, ethyl, propyl, etc.; chloride, bromide or iodide; lower alkyl-lower alkane sulfonate and the like. The quaternizing reactions may be performed in the presence of a solvent such as lower alkanols, e.g., methanol, ethanol, propanol, lower alkanones, e.g., acetone and the like.

The novel end products of this invention, i.e., the compounds of Formula I above, are useful as analgesic agents. More particularly, they are useful analgesic, antipyretic and anti-inflammatory agents. The compound 4-(4-methyl-4-hydroxypiperidino)-4' - fluorobutyrophenone has been found to possess especially potent analgesic activity without morphine-like side effects.

The novel compounds of Formula I can be used as medicaments in the form of pharmaceutical preparations containing one of these novel compounds as active ingredient in admixture with organic or inorganic solid or liquid pharmaceutical excipients in forms suitable for enteral, for example oral, or parenteral administration. Suitable excipients are substances that do not react with the new compounds such as, for example, water, gelatin, lactose, starches, magnesium stearate, talc, vegetable oils, benzyl alcohols, gums, polyalkylene glycols, white petroleum jelly, cholesterol and other known medicinal excipients. The pharmaceutical preparations can take the form of, for example, tablets, dragees, capsules or liquid forms such as solutions, suspensions, emulsions and the like. They may be sterilized and/or contain adjuvants such as preserving, stabilizing, wetting or emulsifying agents, salts for regulating the osmotic pressure, buffers and the like. They may further contain other therapeuticaly useful substances. They can be prepared in unit dosage forms suitable for administration with dosage amounts adjusted according to the individual need and the recommendation of the physician.

The novel compounds of this invention as well as their preparation and use will be more fully understood from a consideration of the examples which follow. These examples are intended to illustrate the invention and are not to be construed as limitative thereof.

EXAMPLE 1

Preparation of 4-(4-methyl-4-hydroxypiperidino)-4'-fluorobutyrophenone hydrochloride 4-methyl-4-hydroxypiperidine (3.4 g.), 6 g. of 4-chloro-4'-fluorobutyrophenone and 6 g. of potassium carbonate were added to 50 ml. of dimethylformamide and the mixture heated on the steam bath overnight. The solvent was removed in vacuo and the residue extracted with ethyl acetate. Addition of a saturated solution of hydrogen chloride in ethyl acetate precipitated the crude product. The product when recrystallized from acetone melted at 142–144°.

*Analysis.*—Calcd. for $C_{16}H_{22}FNO_2 \cdot HCl$ (315.5) (percent): C, 60.85; H, 7.29. Found (percent): C. 60.76; H, 7.09.

EXAMPLE 2

Preparation of 4-(4-butyl-4-hydroxypiperidino)-4'-fluorophenone hydrochloride 1-benzyl-4-piperidone (18.9 g.) was added dropwise to .2 mole of a hexane solution of butyl lithium and 200 ml. of ether. The solution was stirred for 15 min., water added and the layers separated. The ether solution was dried ($K_2CO_3$) and then distilled off. The residue was distilled and the fraction from 140–160°/1.5 mm. was collected. Two runs were combined and added to 110 ml. of a butyl lithium solution in hexane (.1 g./ml.). The reaction was worked up in the usual way to yield 20 g. of 1-benzyl-4-piperidinol, B.P. 163–166°/2 mm. The hydrochloride melted at 135–137° (EtAc—$CH_3OH$).

*Analysis.*—Calcd. for $C_{16}H_{25}NO \cdot HCl$ (283.5) (percent): C, 67.72; H, 9.17. Found (percent): C, 67.46; H, 9.28.

1-benzyl-4-butyl-4-piperidinol (18 g.) was added to 150 ml. of methanol and 3 g. of 10% palladium/carbon and the mixture debenzylated at 60° and an initial hydrogen pressure of 50 lbs. The mixture was worked up in the usual way to yield 4-butyl-4-piperidinol, B.P. 124–125°/7 mm. The maleate melted at 123–125°

(EtAc—$CH_3OH$).

*Analysis.*—Calcd. for $C_9H_{19}NO \cdot C_4H_4O_4$ (percent): C, 57.14; H, 8.43. Found (percent): C, 57.25; H, 8.54.

4-butyl-4-hydroxypiperidine (3.1 g.), 4 g. of 4-chloro-4'-fluorobutyrophenone, 4 g. of potassium carbonate and a trace of potassium iodide were added to 50 ml. of toluene and the mixture refluxed overnight. The mixture was filtered and the solvent removed in vacuo. The residue was dissolved in ethyl acetate and a saturated solution of hydrogen chloride in ethyl acetate was added to precipitate the product as the hydrochloride salt. The salt was recrystallized from acetonitrile and melted at 163–165°.

*Analysis.*—Calcd. for $C_{19}H_{28}FNO_2 \cdot HCl$ (357.5) (percent): C, 63.77; H, 8.11. Found (percent): C, 63.72; H, 8.04.

EXAMPLE 3

Preparation of 4-(4-tertiarybutyl-4-hydroxypiperidino)-4'-fluorobutyrophenone hydrochloride 1-benzyl-4-piperidone (47.2 g.) was added dropwise into 28 ml. of a 1.4 molar solution of tertiary butyl lithium in pentane. The solution was stirred overnight, 100 ml. of water added and the layers separated and worked up in the usual way. 1-benzyl-4-tertiary butyl-4-piperidinol was collected from 131–141°/.6 mm. The distillate was converted to the hydrochloride and upon recrystallizing from acetonitrile melted at 268–269°.

*Analysis.*—Calcd. for $C_{16}H_{25}NO \cdot HCl$ (283.5) (percent): C, 67.71; H, 9.17. Found (percent): C, 67.96; H, 9.39.

1 - benzyl-4-tertiary butyl-4-piperidinol hydrochloride (20 g.) was added to a bottle containing 150 ml. of methanol and 3 g. of 10% palladium/carbon. The hydrogen pressure was raised to 50 lbs. and the shaker started. After 4 hr., the reduction was over and the reaction was worked up in the usual way. The 4-tertiary butyl-4-piperidinol hydrochloride was recrystallized from $CH_3OH$-EtAc and melted at 265–266°.

*Analysis.*—Calcd. for $C_9H_{19}NO \cdot HCl$ (193.5) (percent): C, 55.81; H, 10.34. Found (percent): C, 55.78; H, 10.66.

4-(tertiary butyl)-4-hydroxypiperidine (6.7 g.), 9.2 g. of 4 - chloro-4'-fluorobutyrophenone, 10 g. of potassium carbonate and 1 g. of potassium iodide were added to 100 ml. of benzene and the mixture refluxed overnight. The mixture was filtered and the solvent distilled off in vacuo.

The residue was dissolved in ethyl acetate and a saturated solution of hydrogen chloride in ethyl acetate was added to precipitate the product as the hydrochloride salt. The crude salt was recrystallized from alcohol and melted at 254–255°.

*Analysis.*—Calcd. for $C_{19}H_{28}FNO_2 \cdot HCl$ (357.5): C, 63.77; H, 8.11. Found (percent): C, 63.91; H, 8.15.

EXAMPLE 4

Preparation of 4-[3-(1,1-dimethylpropyloxy)propyl]-4-piperidinol oxalate

1 - benzyl - 4 - [3-(1,1-dimethylpropyloxy)propyl]-4-piperidinol hydrochloride (6.8 g.) was dissolved in 150 ml. of methanol containing 2 g. of 10% palladium/carbon. The compound was debenzylated at 60° and 50 lbs. pressure of hydrogen. The solvent was removed and a saturated solution of sodium carbonate added to the residue to liberate the free base. The base was extracted with chloroform, the solvent removed in vacuo and the residue converted to the oxalate salt. The salt was recrystallized from acetonitrile and melted at 141–142°.

*Analysis.*—Calcd. for $C_{13}H_{27}NO_2 \cdot (COOH)_2$ (319) (percent): C, 56.42; H, 9.09; N, 4.39. Found (percent): C, 56.19; H, 9.03; N, 4.60.

Preparation of 4-{4-[3-(1,1-dimethylpropyloxy)propyl)-4 - hydroxypiperidino} - 4' - fluorobutyrophenone-hydrochloride 4 - [3 - (1,1-dimethylpropyloxy)propyl]-4-piperidinol (4.5 g.), 4 g. of 4-chloro-4'-fluorobutyrophenone, 5 g. of potassium carbonate and a trace of potassium iodide were added to 100 ml. of benzene and the mixture refluxed overnight. Then the mixture was filtered and the solvent removed in vacuo. The residue was dissolved in ethyl acetate and a saturated solution of hydrogen chloride in ethyl acetate was added to precipitate the product as the hydrochloride salt. The salt was recrystallized from ethyl acetate-acetonitrile and melted at 192–193°.

*Analysis.*—Calcd. for $C_{23}H_{36}FNO_3 \cdot HCl$ (429.5) (percent): C, 64.26; H, 8.61; N, 3.26. Found (percent): C, 64.40; H, 9.02; N, 3.43.

EXAMPLE 5

Preparation of 4-[4-(3-hydroxypropyl)-4-hydroxypiperidino]-4'-fluorobutyrophenone hydrochloride 4-{4-[3-(1,1-dimethylpropyloxy)propyl] - 4 - hydroxypiperidino}-4'-fluorobutyrophenone hydrochloride (2.2 g.) was dissolved in 100 ml. of methanol containing some hydrogen chloride and the solution refluxed for 8 hr. Then the solvent was distilled off in vacuo and the residue crystallized from ethyl acetate-acetonitrile (M.P. 113–115°).

*Analysis.*—Calcd. for $C_{18}H_{26}FNO_3 \cdot HCl$ (359.5) (percent): C, 60.08; N, 7.52. Found (percent): C, 60.15; H, 7.33.

EXAMPLE 6

Preparation of 4-(4-methyl-4-propionyloxpiperidino]-4'-fluorobutyrophenone hydrochloride 4-(4-methyl-4-hydroxypiperidino) - 4' - fluorobutyrophenone (4 g.), 20 ml. of propionic anhydride and 1 drop of pyridine were heated on a steam bath overnight. Then the solvent was removed in vacuo and the residue dissolved in ethyl acetate. The hydrochloride of the product was precipitated upon the addition of a saturated solution of hydrogen chloride in ethyl acetate. The salt was recrystallized from acetone and melted at 199–200°.

*Analysis.*—Calcd. for $C_{19}H_{26}FNO_3 \cdot HCl$ (371.5) (percent): C, 61.37; H, 7.27. Found (percent): C, 61.51; H, 7.43.

EXAMPLE 7

Preparation of 1-benzyl-4-cyclopropyl-4-piperidinol

Cyclopropyl lithium was formed in the usual manner from 76 g. of cyclopropyl bromide and 9.4 g. of lithium wire in ether. Then 89 g. of 1-benzyl-4-piperidone was added dropwise. The reaction was worked up in the usual way to yield 1-benzyl-4-cyclopropyl-4-piperidinol, B.P. 145–165°/2 mm.

EXAMPLE 8

Preparation of 4-cyclopropyl-4-piperidinol 1-benzyl-4-cyclopropyl-4-piperidinol (77 g.) was dissolved in 150 ml. of methanol containing 5 g. of palladium/carbon (10%) and the mixture hydrogenated at an initial pressure of 50 p.s.i. of hydrogen until there was no further uptake of hydrogen. The reaction was worked up in the usual way to yield 4-cyclopropyl-4-piperidinol, B.P. 117–120°/7 mm. The hydrochloride melted at 143–145° (EtAc—CH$_3$OH).

*Analysis.*—Calcd. for $C_8H_{15}NO \cdot HCl$ (percent): C, 54.08; H, 9.02. Found (percent): C, 54.10; H, 9.19.

4-cyclopropyl-4-piperidinol (5.6 g.) was added to 50 ml. of alcohol containing 5 g. of triethylamine and 8 g. of 4-chloro-4'-fluorobutyrophenone. The solution was refluxed for 2 hr. and then worked up in the usual manner to yield 4-(4-cyclopropyl-4-hydroxypiperidino - 4' - fluorobutyrophenone hydrochloride, M.P. 183–185° (EtAc—CH$_3$OH).

*Analysis.*—Calcd. for $C_8H_{15}NO \cdot HCl$ (percent): C, 63.25; H, 7.32. Found (percent): C, 63.26; H, 7.68.

EXAMPLE 9

Preparation of 4-(4-cyclohexyl-4-hydroxypiperidino)-4'-fluorobutyrophenone hydrochloride 4-phenyl-4-hydroxypiperidine was reduced as the hydrochloride in the presence of platinum oxide in alcohol solution at 60 p.s.i. and 60° to 4-cyclohexyl-4-hydroxypiperidine hydrochloride, M.P. 248–249° (EtAc—CH$_3$OH).

4-cyclohexyl-4-hydroxypiperidine (5.8 g.) was added to 100 ml. of benzene containing 7 g. of 4-chloro-4'-fluorobutyrophenone, 7 g. of potassium carbonate and 1 g. of potassium iodide and the mixture replaced for 8 hr. The mixture was worked up in the usual way to yield the free base, M.P. 111–113° (EtAc—hexane). The hydrochloride melted at 255–257° (CH$_3$CN).

*Analysis.*—Calcd. for $C_{21}H_{30}FNO_2HCl$ (percent): C, 65.71; H, 8.08. Found (percent): C, 65.99; H, 8.24.

EXAMPLE 10

Test results in animals indicate potent analgesic and anti-inflammatory properties for the ex emplary compounds of Formula I as shown in the table below. The tests employed were as follows:

Yeast inflamed foot test.—Test used to measure the analgesic (mechanical pain), antipyretic and anti-inflammatory effects of compounds on the yeast inflamed rat foot. The $ED_{50}$ is the dose that raises the average pain threshold by 50 mm. of mercury. (Randall, L. O. and Selitto, J. J., Arch Int. Pharmacodyn., 111: 409 (1957).

Carrageenin anti-edema test.—Test used to measure the anti-edema effects of compounds on the carrageenin inflamed rat foot. The $ED_{30}$ is the dose that reduces the volume of edema by 30 percent (Winter, C. A., Risley, E. A. and Nuss, G. W., Proc. Soc. Exptl. Biol. Med. 111: 544 (1962).

Hot plate test.—Test used to measure the analgesic effects of compounds on mice exposed to thermal pain (55.0±0.5° C.). The $ED_{50}$ is the dose that increases the average reaction time to thermal pain by 50 percent. (Eddy, N. B. et al., J. Pharm. & Exptl. Therap. vol. 98: (2) (1950) and Woolfe, G. and MacDonald, A. D., J. Pharm. & Exptl. Therap. vol. 80: 300 (1944).

Phenylquinone writhing test.—Test used to measure the analgesic effects of compounds on mice exposed to intra-abdominally induced chemical pain. The $ED_{50}$ is the dose which reduces the total number of writhes by 50 percent (Siegmund, E., et al., Proc. Soc. Exptl. Biol. Med. 95: 729 (1957).

Tail flick test.—Test used to measure the analgesic effects of compounds on mice exposed to a radiant heat source. The endpoint is reached when the mouse flicks his tail away from the painful stimulus. The ED₅₀ is the dose which raises the average reaction time by 50 percent (Gross, F., Helv. Physiol, Acta. C31 (1947)).

TABLE I

Analgesic, anti-inflammatory, and tranquillizing activity ($ED_{50}$ p.o. in mg./kg.)

| Compound | Mice hot plate | Mice writhing | Tail flick | Rat carrageenin anti-edema $ED_{30}$ | Rat yeast infl. foot | Mice inclined screen | Mice foot shock |
|---|---|---|---|---|---|---|---|
| 4-(4-methyl-4-hydroxypiperidino)-4'-fluorobutyrophenone hydrochloride | 0.7 | 0.6 | 3.2 | 20 | 20 | 10 | 10 |
| 4-(4-tertiary butyl-4-hydroxypiperidino)4'-fluorobutyrophenone hydrochloride | 2.4 | 1.2 | | 38 | 21 | 10 | 30 |
| 4-(4-butyl-4-hydroxypiperidino)-4'-fluorobutyrophenone hydrochloride | 3.1 | 1.8 | | 32 | 17 | 20 | 40 |
| 4-(4-methyl-4-propionyloxypiperidino)-4'-fluorobutyrophenone hydrochloride | 1.6 | 0.68 | | 12.5 | 18 | 15 | 30 |
| Acetylsalicylic acid | | 101 | | 33 | 35 (c.p.) | | |
| Morphine sulphate | 3 | | | | | | |
| Reserpine | | | | | | 10 | |

No morphine-like catatonia in rats or the straub tail effect in mice was observed. In cats sedation and relaxation of the nictating membrane was observed at doses of 0.25 mg./kg. P.O. No morphine-like mania was induced.

EXAMPLE 11

4-(4-methyl-4-hydroxypiperidino)-4'-fluorobutyrophenone hydrochloride

TABLET FORMULATION

| | Mg. per tablet |
|---|---|
| 4-(4-methyl - 4 - hydroxypiperidino) - 4' - fluorobutyrophenone hydrochloride | 10.0 |
| Lactose | 129.0 |
| Corn starch | 50.0 |
| Pregelatinized corn starch | 8.0 |
| Calcium stearate | 3.0 |
| Total weight | 200.0 |

PROCEDURE (1) 4-(4-methyl - 4 - hydroxypiperidino) - 4' - fluorobutyrophenone hydrochloride, lactose, corn starch and pregelatinized corn starch were mixed in a suitable mixer.

(2) The mix was passed through a Fitzpatrick comminuting machine fitted with No. 1A screen and with knives forward.

(3) The mixture was returned to the mixer and moistened with water to a thick paste. The moist mass was passed through a No. 12 screen, and the moist granules were dried on paper lined trays at 110° F.

(4) The dried granules were returned to the mixer, and the calcium stearate was added and mixed well.

(5) The granules were compressed at a tablet weight of 200 mg. using standard concave punches having a diameter of ⁵⁄₁₆".

CAPSULE FORMATION

| | Mg. per capsule |
|---|---|
| 4-(4-methyl - 4 - hydroxypiperidino) - 4' - fluorobutyrophenone hydrochloride | 25.5 |
| Lactose | 159.5 |
| Corn starch | 30.0 |
| Talc | 5.0 |
| Total weight | 220.0 |

PROCEDURE (1) 4-(4-methyl - 4 - hydroxypiperidino) - 4' - fluorobutyrophenone hydrochloride, lactose and corn starch were mixed in a suitable mixer.

(2) The mixture was passed through a Fitzpatrick comminuting machine using a No. 1A screen and knives forward.

(3) The mixture was returned to the mixer and the talc added. It was blended well and filled into No. 4 two piece, hard gelatin capsules on a Parke Davis capsulating machine. (Any similar type capsulating machine may be used.)

SUPPOSITORY FORMULATION

| | Gm. per 1.3 gm. suppository |
|---|---|
| 4-(4-methyl - 4 - hydroxypiperidino) - 4' - fluorobutyrophenone hydrochloride | 0.025 |
| Wecobee M [1] | 1.230 |
| Carnauba Wax | 0.045 |
| Total weight | 1.300 |

[1] E. F. Drew Company, 522 Fifth Avenue, New York, N.Y. 10010.

PROCEDURE (1) The Wecobee M and the carnauba wax were melted in a suitable size glass lined container, mixed well and cooled to 45° C.

(2) 4-(4-methyl - 4 - hydroxypiperidino) - 4' - fluorobutyrophenone hydrochloride, which had been reduced to a fine powder with no lumps, was stirred until completely and uniformly dispersed.

(3) The mixture was poured into suppository molds to yield suppositories having an individual weight of 1.3 gms.

(4) The suppositories were cooled and removed from molds. They were then individually wrapped in wax paper for packaging.

PARENTERAL FORMULATION 4-(4-methyl - 4 - hydroxypiperidino)-4'-fluorobutyrophenone hydrochloride was prepared in duplex ampuls, one containing the dry drug and the other containing water for injection, U.S.P.

4-(4-methyl-4-hydroxypiperidino) - 4' - fluorobutyrophenone hydrochloride dry fill ampul 5 cc.—25 mg.

A parenteral grade of 4-(4-methyl-4- hydroxypiperidino)-4'-fluorobutyrophenone hydrochloride, fiber free, was filled into the ampul using a Diehl Mater electric filler. The ampuls were sealed and sterilized at 255° F. for 2 hours.

Immediately before use the powder was solubilized with the following solution: Water for injection, U.S.P. (dry fill ampul 5 cc.)—5 cc.

We claim:
1. 4-[4-[3-(1,1-dimethylpropyloxy)propyl]-4-hydroxy-piperidino]-4'-fluorobutyrophenone.
2. 4-[4-(3 - hydroxypropyl)-4-hydroxypiperidino]-4'-fluorobutyrophenone.

References Cited

UNITED STATES PATENTS 3,438,991   4/1969   Janssen _____ 260—294.7

OTHER REFERENCES

McManus et al., J. Med. Chem., 8, 766–76 (1965).
House et al., J. Org. Chem., 28, 2407–16 (1963).
McElvain et al., J. Am. Chem. Soc., 77, 2848–50 (1955).
Randall et al., J. Pharm. & Exper. Therapy, 93, 314–28 (1948).
Vaculik et al., Chem. Absts., 53: 11365a (1959).

HENRY R. JILES, Primary Examiner
G. T. TODD, Assistant Examiner

U.S. Cl. X.R.

260—293.65; 293.83, 293.84, 293.86, 293.9; 424—267

UNITED STATES PATENT OFFICE
CERTIFICATE OF CORRECTION

Patent No. 3,679,666                    Dated July 25, 1972

Inventor(s)  Malatestinic and Ziering

It is certified that error appears in the above-identified patent and that said Letters Patent are hereby corrected as shown below:

Column 4, line 15

20 g. of 1-benzyl-4-piperidinol should be 20 g. of 1-benzyl-4-butyl-4-piperidinol Signed and sealed this 23rd day of January 1973.

(SEAL)
Attest:

EDWARD M. FLETCHER, JR.　　　　　　　　　ROBERT GOTTSCHALK
Attesting Officer　　　　　　　　　　　　Commissioner of Patents